(12) United States Patent
Hoshi

(10) Patent No.: US 10,850,621 B2
(45) Date of Patent: Dec. 1, 2020

(54) VEHICLE SYSTEM

(71) Applicant: TOYOTA JIDOSHA KABUSHIKI KAISHA, Toyota (JP)

(72) Inventor: Kenji Hoshi, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 16/291,805

(22) Filed: Mar. 4, 2019

(65) Prior Publication Data
US 2019/0308507 A1    Oct. 10, 2019

(30) Foreign Application Priority Data

Apr. 6, 2018    (JP) .................................. 2018-073900

(51) Int. Cl.
*B60L 7/16*    (2006.01)
*B60L 7/18*    (2006.01)
(Continued)

(52) U.S. Cl.
CPC .................... *B60L 7/16* (2013.01); *B60L 7/18* (2013.01); *B60L 15/2009* (2013.01); *B60W 10/18* (2013.01); *B60W 10/26* (2013.01); *B60W 20/14* (2016.01); *B60W 30/18127* (2013.01); *B60L 2240/12* (2013.01); *B60L 2240/443* (2013.01);
(Continued)

(58) Field of Classification Search
CPC ...... B60W 10/26; B60W 10/06; B60W 10/08; B60W 10/18; B60W 10/30; B60W 30/18127; B60W 20/14; B60W 2510/244; B60W 2710/0605; B60W 2710/0627; B60W 2540/10; B60L 7/16; B60L 7/18; B60L 7/26; B60L 58/13; B60L 15/2009; B60L 2240/443; B60L 2240/445;
(Continued)

(56) References Cited

U.S. PATENT DOCUMENTS 5,823,280 A * 10/1998 Lateur ................... B60W 10/26
                                                                                180/65.235
6,543,565 B1 * 4/2003 Phillips ..................... B60K 6/48
                                                                                  180/165

(Continued)

FOREIGN PATENT DOCUMENTS

JP        2017-139839 A        8/2017

*Primary Examiner* — Robert A. Siconolfi
*Assistant Examiner* — San M Aung
(74) *Attorney, Agent, or Firm* — Oliff PLC

(57) ABSTRACT

A vehicle system includes a regenerative braking device; a battery configured to charge electric power; an internal combustion engine including a fuel injection valve and an oil pressure control device that controls engine oil pressure; and a control device. The control device is configured, where depression of an accelerator pedal is released when the battery is in a non-fully charged state, to execute a fuel cut processing and a regenerative braking processing. On the other hand, the control device is configured, where depression of the accelerator pedal is released when the battery is in a fully charged state, to execute the fuel cut processing and an oil pressure increase processing to control the oil pressure control device such that the engine oil pressure becomes higher than an oil pressure value used when depression of the accelerator pedal is released in the non-fully charged state.

4 Claims, 11 Drawing Sheets

(51) Int. Cl.
*B60W 10/18* (2012.01)
*B60W 10/26* (2006.01)
*B60L 15/20* (2006.01)
*B60W 30/18* (2012.01)
*B60W 20/14* (2016.01)
*B60W 10/08* (2006.01)
*B60W 10/06* (2006.01)

(52) U.S. Cl.
CPC ............ *B60W 10/06* (2013.01); *B60W 10/08* (2013.01); *B60Y 2200/92* (2013.01)

(58) Field of Classification Search
CPC ........... B60L 2240/485; B60L 2240/12; B60K 6/445; B60Y 2200/92
USPC ........................................................ 303/152
See application file for complete search history.

(56) References Cited

U.S. PATENT DOCUMENTS

| | | | |
|---|---|---|---|
| 6,554,088 B2* | 4/2003 | Severinsky | B60K 6/46 180/65.23 |
| 2004/0050598 A1* | 3/2004 | Saito | B60L 15/2009 180/65.225 |
| 2010/0228461 A1* | 9/2010 | Sugai | B60K 6/445 701/101 |

\* cited by examiner

Non-fully charged state

Fully charged state

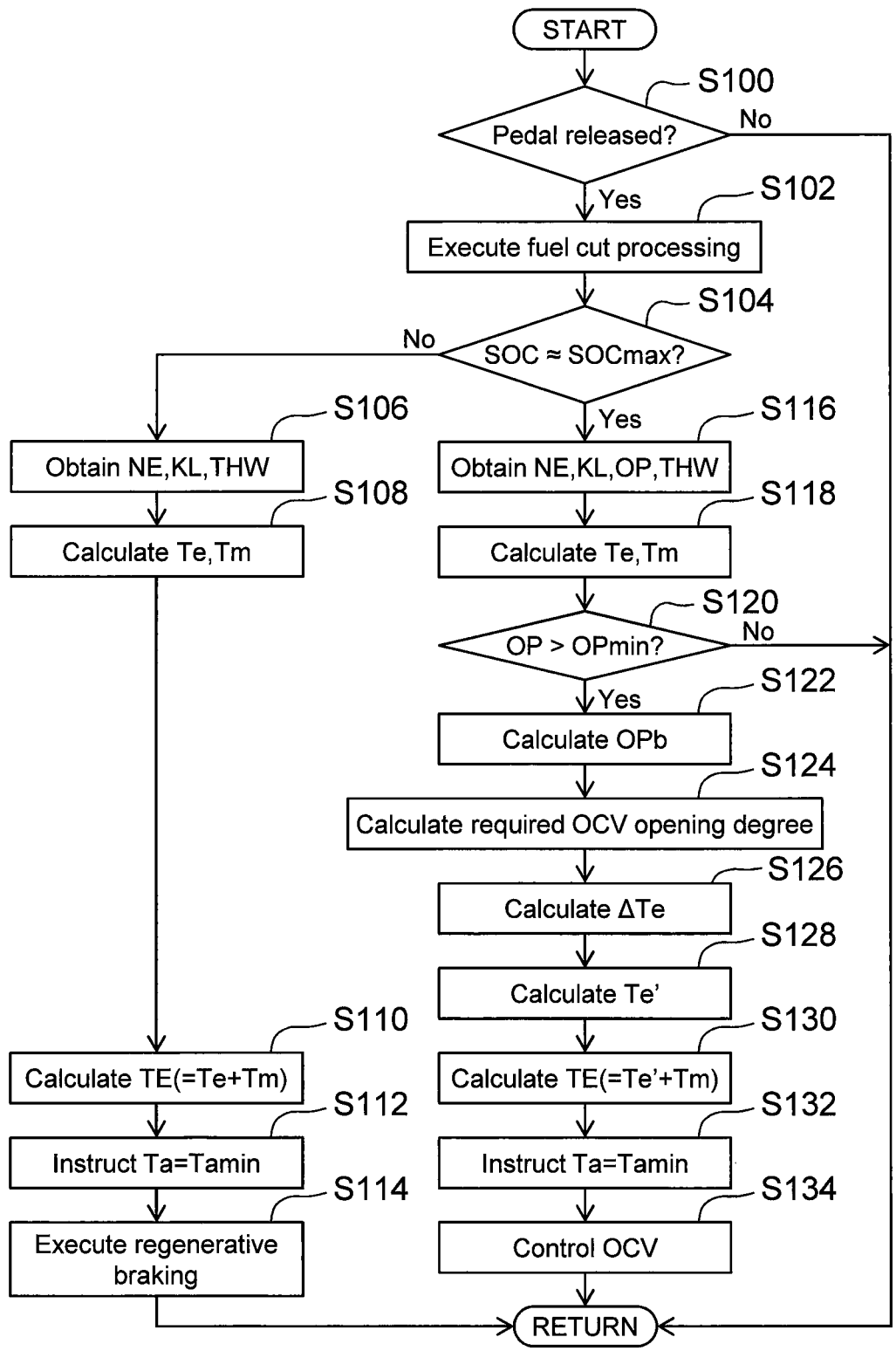

Fully charged state: Without oil pressure increase processing

Fully charged state: With oil pressure increase processing

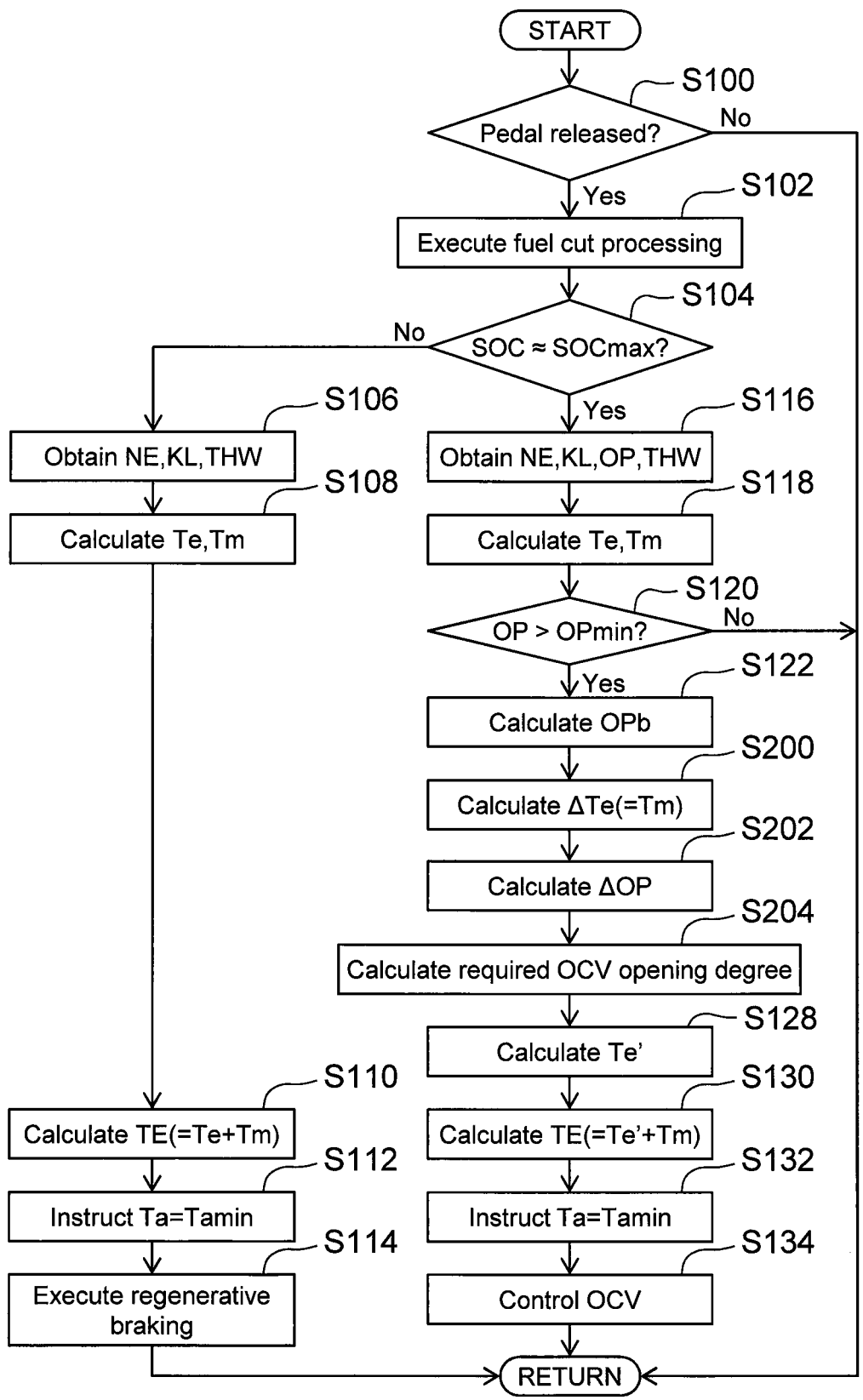

VEHICLE SYSTEM

CROSS-REFERENCE TO RELATED APPLICATION

This application is based on and claims the benefit of Japanese Patent Application No. 2018-073900, filed on Apr. 6, 2018, which is incorporated by reference herein in its entirety.

BACKGROUND

Technical Field

The present disclosure relates to a vehicle system, and more particularly to a vehicle system provided with a regenerative braking device and an internal combustion engine.

Background Art

For example, JP 2017-139839 A discloses an electric vehicle provided with a regenerative braking device.

SUMMARY

According to a vehicle provided with a regenerative braking device as described in JP 2017-139839 A, regenerative braking can be used to brake the vehicle when depression of the accelerator pedal is released. If, however, a battery to charge electric power generated by the regenerative braking is in a fully charged state, the charging by the regenerative braking cannot be performed.

As a result, there is a concern that, as compared to when the battery is not in the fully charged state, the degree of deceleration of the vehicle may decrease and the driver of the vehicle may thus feel strange.

The present disclosure has been made to address the problem described above, and an object of the present disclosure is to provide a vehicle system that can reduce decrease of the degree of deceleration when a battery to charge electric power generated by a regenerative braking is in a fully charged state as compared to when it is not in the fully charged state.

A vehicle system according to one aspect of the present disclosure includes: a regenerative braking device configured to recover kinetic energy of a vehicle during deceleration of the vehicle to convert the kinetic energy into electric power; a battery configured to charge the electric power; an internal combustion engine including a fuel injection valve and an oil pressure control device that controls engine oil pressure; and a control device configured to control the internal combustion engine and the regenerative braking device. The control device is configured to: execute, where depression of an accelerator pedal is released when the battery is in a non-fully charged state, a fuel cut processing to control the fuel injection valve to stop fuel injection and a regenerative braking processing to actuate the regenerative braking device; and execute, where depression of the accelerator pedal is released when the battery is in a fully charged state, the fuel cut processing and an oil pressure increase processing to control the oil pressure control device such that the engine oil pressure becomes higher than an oil pressure value used where depression of the accelerator pedal is released in the non-fully charged state.

The internal combustion engine may include a throttle valve arranged in an intake air passage. The control device may be configured, where depression of the accelerator pedal is released when the battery is in the fully charged state and engine speed is higher than a threshold value, to execute, in addition to the fuel cut processing and the oil pressure increase processing, a throttle opening degree increase processing to control the throttle valve such that an opening degree of the throttle valve becomes greater than an opening degree used where depression of the accelerator pedal is released in the non-fully charged state.

The oil pressure increase processing may include: a first processing to calculate an increase amount of the engine oil pressure necessary to increase an engine braking torque by an increase amount that is equal to a regenerative torque generated by the regenerative braking processing in the non-fully charged state; and a second processing to control the oil pressure control device such that the engine oil pressure increases by the calculated increase amount of the engine oil pressure.

A vehicle system according to another aspect of the present disclosure includes: a regenerative braking device configured to recover kinetic energy of a vehicle during deceleration of the vehicle to convert the kinetic energy into electric power; a battery configured to charge the electric power; an internal combustion engine including a fuel injection valve and a throttle valve arranged in an intake air passage; and a control device configured to control the internal combustion engine and the regenerative braking device. The control device is configured to: execute, where depression of an accelerator pedal is released when the battery is in a non-fully charged state, a fuel cut processing to control the fuel injection valve to stop fuel injection and a regenerative braking processing to actuate the regenerative braking device; and execute, where depression of the accelerator pedal is released when the battery is in a fully charged state and engine speed is higher than a threshold value, the fuel cut processing and a throttle opening degree increase processing to control the throttle valve such that an opening degree of the throttle valve becomes greater than an opening degree used where depression of the accelerator pedal is released in the non-fully charged state.

According to the vehicle system of one aspect of the present disclosure, where depression of the accelerator pedal is released when the battery is in the fully charged state, the fuel cut processing and the oil pressure increase processing are executed. This oil pressure increase processing controls the oil pressure control device such that the engine oil pressure becomes higher than an oil pressure value used where depression of the accelerator pedal is released in the non-fully charged state. When the engine oil pressure is made higher by the oil pressure increase processing, the friction loss torque of the internal combustion engine becomes higher and the engine braking torque thus becomes higher. As a result, a decrease of the braking torque of the vehicle due to the fact that the regenerative braking cannot be used can be reduced (i.e., complemented) by an increase of the engine braking torque. Because of this, a decrease of the degree of deceleration of the vehicle can be reduced. Therefore, the vehicle system of one aspect of the present disclosure can allow the driver to be hard to feel strange concerning the deceleration due to a change of the SOC of the battery.

Furthermore, according to the vehicle system of another aspect of the present disclosure, where depression of the accelerator pedal is released when the battery is in the fully charged state and the engine speed is higher than the threshold value, the fuel cut processing and the throttle opening degree increase processing are executed. The throttle opening degree increase processing controls the throttle valve such that the opening degree of the throttle valve becomes greater than an opening degree used where depression of the accelerator pedal is released in the non-fully charged state. In a high-speed region, when the throttle opening degree is increased, an increase amount of the friction loss torque becomes greater than a decrease amount of the pumping loss torque. Thus, according to the throttle opening degree increase processing, the engine braking torque becomes higher. As a result, a decrease of the braking torque of the vehicle due to the fact that the regenerative braking cannot be used can be reduced (i.e., complemented) by an increase of the engine braking torque. Because of this, a decrease of the degree of deceleration of the vehicle can be reduced. Therefore, the vehicle system of another aspect of the present disclosure can allow the driver to be hard to feel strange concerning the deceleration due to a change of the SOC of the battery.

BRIEF DESCRIPTION OF THE DRAWINGS

FIG. 6 is a flow chart that illustrates a routine of the processing concerning control during the deceleration of the vehicle according to the first embodiment of the present disclosure;

FIG. 8 is a flow chart that illustrates a routine of the processing concerning control during the deceleration of the vehicle according to a second embodiment of the present disclosure;

DETAILED DESCRIPTION

In the following, embodiments of the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

Firstly, a first embodiment according to the present disclosure will be described with reference to FIGS. 1 to 7.

1-1. Example of Configuration of Vehicle System

Figure 1:
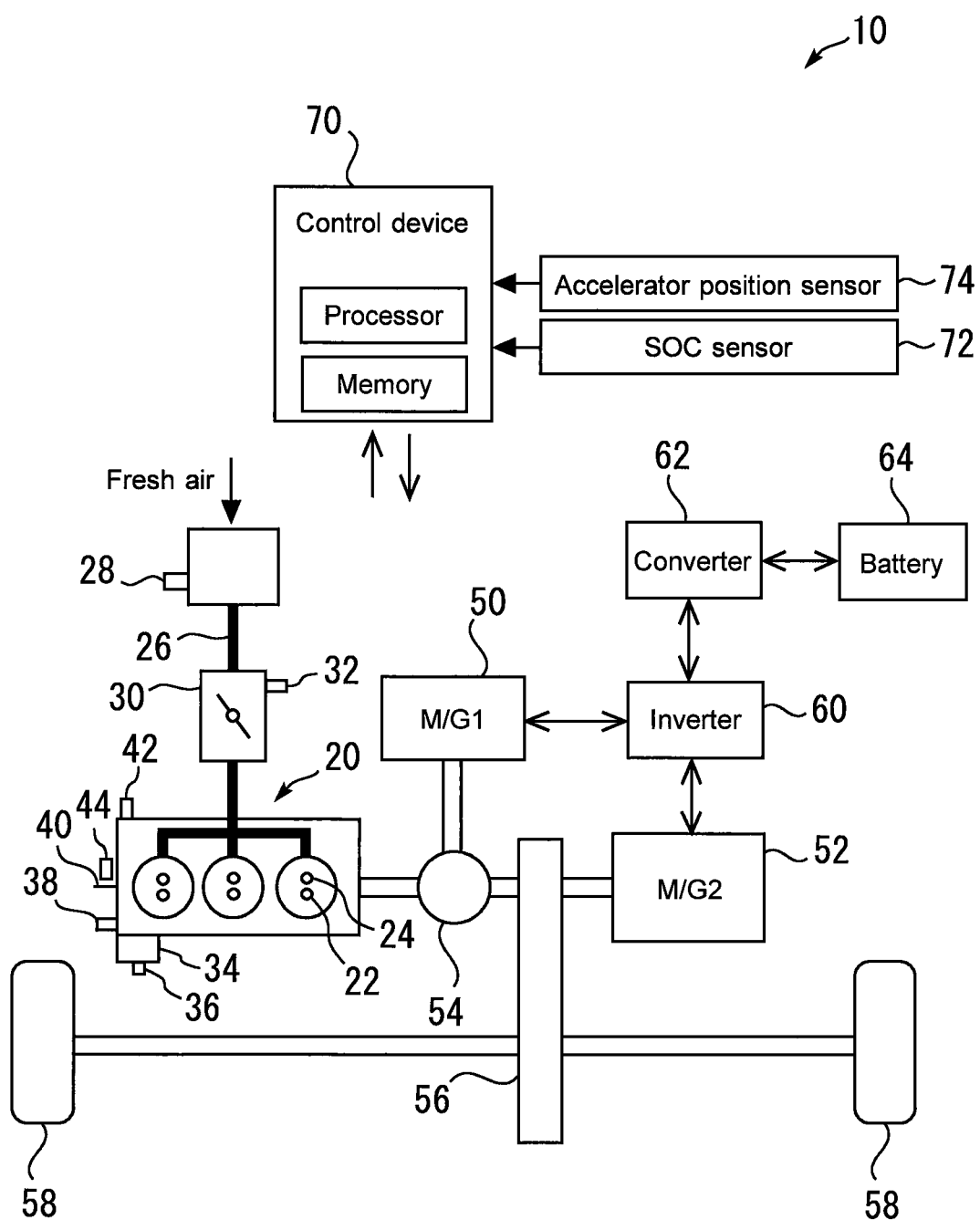
FIG. 1 is a schematic diagram for describing an example of the configuration of a vehicle system according to a first embodiment of the present disclosure.

FIG. 1 is a schematic diagram for describing an example of the configuration of a vehicle system 10 according to the first embodiment of the present disclosure. The vehicle system 10 shown in FIG. 1 is provided with an internal combustion engine 20, a first motor generator (M/G1) 50 and a second motor generator (M/G2) 52 as power sources of the vehicle. That is to say, the vehicle system 10 is applied to a hybrid vehicle as an example.

As an example, the internal combustion engine 20 is a spark ignition in-line three-cylinder engine. However, the internal combustion engine according to the present disclosure may alternatively be a compression ignition engine, and the number and arrangement of cylinders thereof are not particularly limited. The internal combustion engine 20 is equipped with fuel injection valves 22 and an ignition device 24 (only ignition plugs are illustrated). Each of the fuel injection valves 22 is arranged for the corresponding cylinder, and injects fuel, for example, directly into the corresponding cylinder. The ignition device 24 ignites an air-fuel mixture in each cylinder by the use of the spark plug arranged for each cylinder.

In the vicinity of an inlet of an intake air passage 26 of the internal combustion engine 20, an air flow sensor 28 that outputs a signal responsive to the flow rate of air taken into the intake air passage 26 is arranged. An electronically-controlled throttle valve 30 is arranged in a portion of the intake air passage 26 located on the downstream side of the air flow sensor 28. A throttle opening degree sensor 32 that outputs a signal responsive to a throttle opening degree Ta is attached to the throttle valve 30.

Moreover, the internal combustion engine 20 is equipped with an oil pump 34, an oil control valve (OCV) 36 and an oil pressure sensor 38. The oil pump 34 is driven to rotate by, for example, a torque of a crankshaft 40, and supplies engine oil (lubrication oil) to individual portions of the internal combustion engine 20. The OCV 36 is arranged on an oil pressure passage which is not shown. By adjusting the opening degree of the OCV 36, the oil pressure supplied to the individual portions of the internal combustion engine 20 from the oil pump 34 (hereunder, referred to as "engine oil pressure OP") can be controlled. The oil pressure sensor 38 outputs a signal responsive to this engine oil pressure OP. It should be noted that the OCV 36 corresponds to an example of the "oil pressure control device" according to the present disclosure.

Furthermore, the internal combustion engine 20 is equipped with a water temperature sensor 42 and a crank angle sensor 44. The water temperature sensor 42 outputs a signal responsive to temperature THW of engine cooling water that cools the internal combustion engine 20. The crank angle sensor 44 outputs a signal responsive to crank angle.

The motor generator 50 and the motor generator 52 are both electric motors that can generate electric power. That is to say, the motor generators 50 and 52 are alternate current synchronous motor generators having both a function as an electric motor that outputs a torque using a supplied electric power and a function as a generator that transduces an inputted mechanical power into the electric power. The first motor generator 50 is mainly used as the generator, and the second motor generator 52 is mainly used as the electric motor. Hereunder, for ease of explanation, the first motor generator 50 is simply noted as the generator 50, and the second motor generator 52 is simply noted as the motor 52.

The internal combustion engine 20, the generator 50 and the motor 52 are coupled to wheels 58 via the power split device 54 and a speed reducer 56. The power split device 54 is, for example, a planetary gear unit and splits the torque outputted from the internal combustion engine 20 into torques of the generator 50 and the wheels 58. To be more specific, in the power split device 54: a sun gear is coupled to the rotational shaft of the generator 50; a planetary carrier is coupled to the crankshaft 40 of the internal combustion engine 20; and a ring gear is coupled to the rotational shaft of the motor 52. The torque outputted from the internal combustion engine 20 or the torque outputted from the motor 52 is transmitted to the wheels 58 via the speed reducer 56. The generator 50 regenerates electric power using a torque supplied from the internal combustion engine 20 via the power split device 54.

The generator 50 and the motor 52 each perform the supply and receipt of the electric power with a battery 64 via an inverter 60 and a converter 62. The inverter 60 converts the electric power stored in the battery 64 from direct current (DC) to the alternating current (AC) to supply the motor 52 with this AC, and converts the electric power generated by the generator 50 from AC to DC to store the battery 64. As a result, the battery 64 is charged with the electric power generated by the generator 50, and the electric power stored in the battery 64 is discharged when it is consumed by the motor 52.

According to the vehicle system 10 configured as described above, a regenerative braking can be performed by the use of the motor 52 during deceleration of the hybrid vehicle with the supply of fuel into the internal combustion engine 20 stopped. To be more specific, the inverter 60 is controlled such that power generation load (regenerative load) is applied to the motor 52 during the deceleration, whereby the motor 52 can be driven to rotate by the wheels 58. As a result, the kinetic energy of the vehicle can be recovered during the deceleration and converted to electric power. That is to say, the motor 52 and the inverter 60 correspond to an example of the "regenerative braking device" according to the present disclosure. The battery 64 stores the above-described electric power generated by this regenerative braking device. In addition, according to the vehicle system 10, by controlling the energization of the generator 50 during the deceleration performed with the supply of fuel into the internal combustion engine 20 stopped, a state where the internal combustion engine 20 is passively driven to rotate by the rotation of the wheels (drive wheels) 58 (i.e., motoring state) can be achieved without the rotation of the internal combustion engine 20 stopped. The deceleration of the vehicle described below is premised on that the internal combustion engine 20 is put in the motoring state.

The vehicle system 10 according to the present embodiment is provided with a control device 70 for controlling a power train that includes the internal combustion engine 20, the generator 50 and the motor 52. The control device 70 is an electronic control unit (ECU) that includes at least one processor, at least one memory, and an input/output interface.

The input/output interface receives sensor signals from various sensors attached to the internal combustion engine 20 and the hybrid vehicle on which the internal combustion engine 20 is mounted, and also outputs actuating signals to various actuators for controlling the operation of the internal combustion engine 20 and the hybrid vehicle. The various sensors described above include an SOC sensor 72 and an accelerator position sensor 74 in addition to the air flow sensor 28, the throttle opening degree sensor 32, the oil pressure sensor 38, the water temperature sensor 42 and the crank angle sensor 54 that are described above. The SOC sensor 72 is arranged to detect a charging rate (i.e., SOC: State Of Charge) of the battery 64. The accelerator position sensor 74 outputs a signal responsive to depression amount (i.e., accelerator position) of an accelerator pedal of the hybrid vehicle. The control device 70 can calculate an engine speed NE by the use of the signal of the crank angle sensor 44.

Furthermore, the various actuators described above include the fuel injection valves 22, the ignition device 24, the throttle valve 30, the OCV 36, the generator 50 and the motor 52. In the memory of the control device 70, various programs and various data (including maps) for controlling the hybrid vehicle are stored. The processor executes the programs stored in the memory. As a result, various functions of the control device 70 (such as, various engine controls, and regenerative braking) are achieved. It should be noted that the control device 70 may alternatively be configured with a plurality of ECUs.

1-2. Control During Deceleration of Vehicle 1-2-1. Fuel Cut Processing

According to the vehicle system 10 of the present embodiment, where depression of the accelerator pedal is released, the control device 70 executes a "fuel cut processing" that controls the fuel injection valves 22 to stop fuel injection for the respective cylinders. To be more specific, the fuel cut processing is executed, provided that a designated execution condition is met (e.g., provided that the engine speed NE is higher than or equal to a designated value). During the deceleration of the vehicle after the fuel cut processing is executed, the motoring state is achieved as a result of the internal combustion engine 20 being passively driven to rotate by the rotation of the wheels (drive wheels) 58. In this motoring state, the internal combustion engine 20 generates a braking torque.

1-2-2. Use and Issue of Regenerative Braking

The vehicle system 10 is provided with the motor 52 and the inverter 60 that serve as the regenerative braking device described above. Because of this, when the fuel cut processing is executed during the deceleration, the regenerative braking can be used for the braking of the vehicle (regenerative braking processing). The battery 64 is charged by the use of the electric power generated by the regenerative braking, whereby the power of the internal combustion engine 20 used to generate the electric power consumed by the motor 52 can be reduced. As a result, the fuel efficiency of the internal combustion engine 20 can be improved.

Figure 2A:
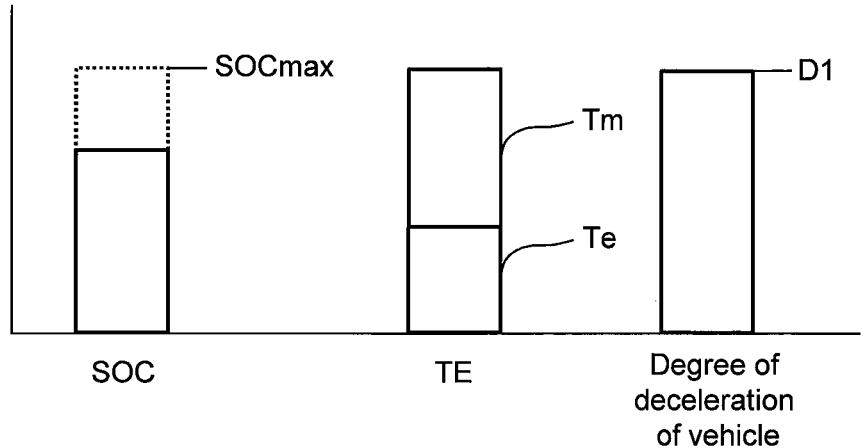
FIG. 2A is a graph that illustrates a relationship among SOC of a battery, a required total braking torque TE and the degree of deceleration of a vehicle.
Figure 2B:
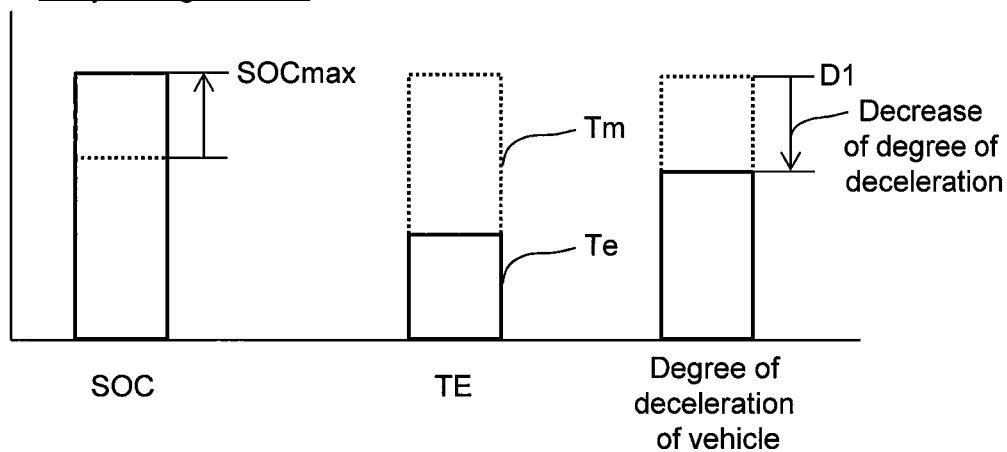
FIG. 2B is a graph that illustrates a relationship among the SOC of the battery, the required total braking torque TE and the degree of deceleration of the vehicle.

FIGS. 2A and 2B are graphs that illustrate relationships among the SOC of the battery 64, a required total braking torque TE and the degree of deceleration of the vehicle. It should be noted that, in FIGS. 2A and 2B, a required engine braking torque Te corresponds to a required value of the braking torque generated by the internal combustion engine 20 during a fuel cut operation (i.e., during the motoring operation) at the time of the deceleration of the vehicle. A required regenerative torque Tm corresponds to a required value of the braking torque generated by the motor 52 during the regenerative braking at the time of the deceleration of the vehicle. Also, the required total braking torque TE corresponds to the sum of the required engine braking torque Te and the required regenerative torque Tm.

FIG. 2A indicates a relationship obtained when the battery 64 is not in a fully charged state (i.e., the when the battery 64 is in a non-fully charged state), and FIG. 2B indicates a relationship obtained when the battery 64 is the fully charged state. The "fully charged state" of the battery 64 mentioned here corresponds to a state where the SOC of the battery 64 is substantially equal to an upper limit value (more specifically, upper limit value of the SOC within a designated usage range) SOCmax of the SOC (SOC≈SOC-max).

In the example of the non-fully charged state shown in FIG. 2A, the regenerative braking is used, whereby a braking torque that satisfies both of the required engine braking torque Te and the required regenerative torque Tm is applied to the vehicle. As a result, the degree D1 of deceleration is obtained.

In the example of the fully charged state shown in FIG. 2B, the deceleration of the vehicle is started from the same vehicle speed condition as the example shown in FIG. 2A. If the battery 64 that charges the electric power generated by the regenerative braking is in the fully charged state, the charging by the regenerative braking cannot be performed. As a result, as shown in FIG. 2B, the required regenerative torque Tm cannot be obtained. Because of this, there is a concern that, as compared to the example of the non-fully charged state, the degree of deceleration of the vehicle may decrease and the driver of the vehicle may thus feel strange.

Figure 3:
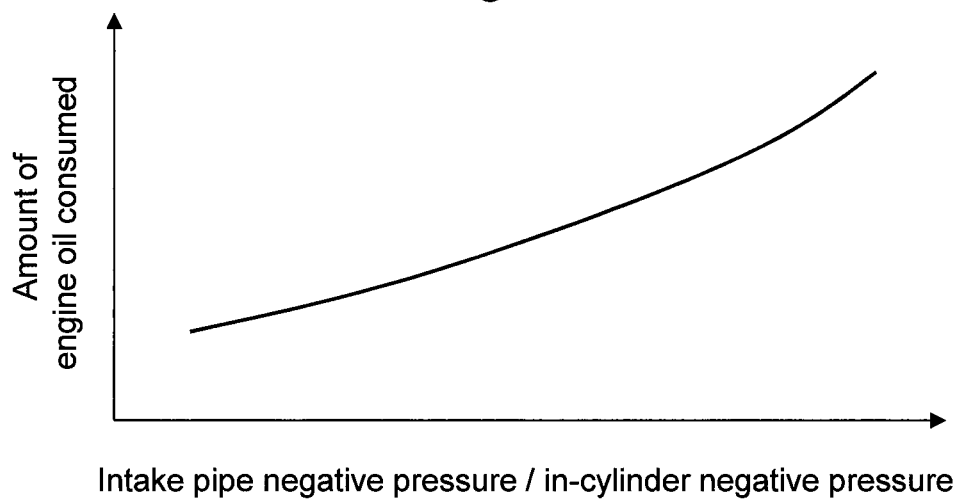
FIG. 3 is a graph that illustrates a relationship of the amount of engine oil consumed with respect to intake pipe negative pressure and in-cylinder negative pressure.

FIG. 3 is a graph that illustrates a relationship of the amount of engine oil consumed with respect to the intake pipe negative pressure and in-cylinder negative pressure. In order to reduce decrease of the degree of deceleration of the vehicle described above in the fully charged state, the following countermeasures may be taken. That is to say, a throttle valve may be fully closed and a variable valve timing device may be controlled such that both of intake and exhaust valves are not open at the initial stage of the intake stroke. However, if this kind of countermeasures are taken, the intake pipe negative pressure becomes higher and the in-cylinder negative pressure also becomes higher. As shown in FIG. 3, the amount of engine oil consumed becomes greater since, when at least one of the intake pipe negative pressure and the in-cylinder negative pressure becomes higher, the amount of the engine oil flowing into combustion chambers becomes greater. Because of this, there is a concern that, if the countermeasures described above are used, the amount of engine oil consumed may become too large.

Figure 4:
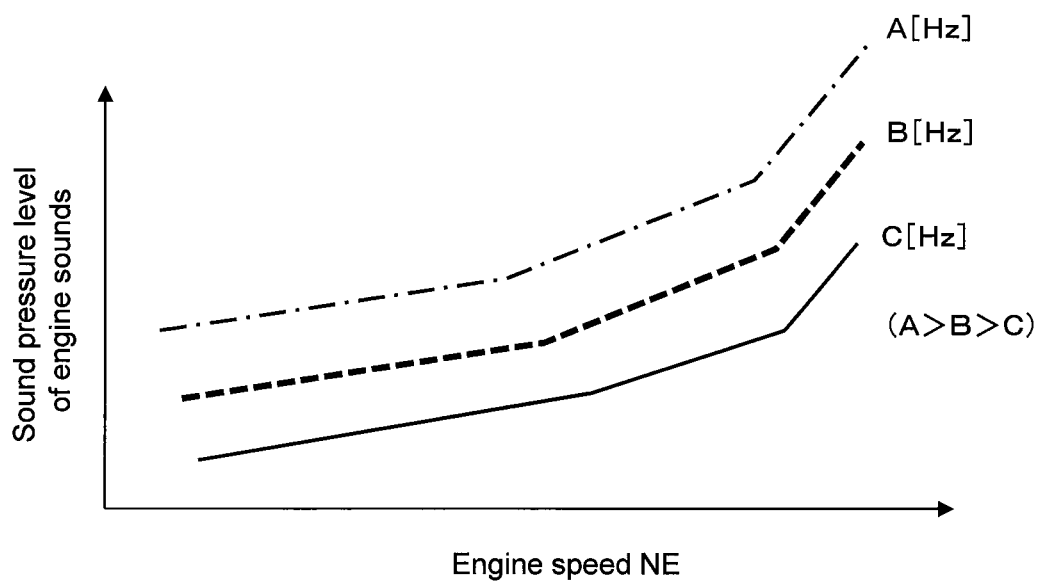
FIG. 4 is a graph that illustrates a relationship between the sound pressure level of engine sound and an engine speed NE.

FIG. 4 is a graph that illustrates a relationship between the sound pressure level of engine sound and the engine speed NE. As one of other countermeasures for reducing decrease of the degree of deceleration of the vehicle described above, the engine speed NE may be increased. However, as shown in FIG. 4, the number of cycles per unit time becomes greater when the engine speed NE becomes higher. As a result, the sound pressure level of the engine sound becomes higher. In addition, as in examples of frequencies A to C of the engine sound shown in FIG. 4, the sound pressure level becomes higher when the frequency is higher. Thus, if this countermeasure is used, the engine speed NE during the deceleration from a constant speed of the vehicle differs in accordance with whether or not a battery is in the full-charged state. Thus, engine sounds caught by the driver in the vehicle interior become different. As a result, there is a concern that the driver may feel strange due to this kind of difference of the engine sounds.

1-2-3. Outline of Countermeasures (Oil Pressure Increase Processing) According to First Embodiment According to the present embodiment, where the battery 64 is in the non-fully charged state when depression of the accelerator pedal is released, the control device 70 executes the fuel cut processing and the regenerative braking processing described above. On the other hand, where the battery 64 is in the "fully charged state" when depression of the accelerator pedal is released, the control device 70 executes an "oil pressure increase processing" described below in addition to the fuel cut processing.

Figure 5:
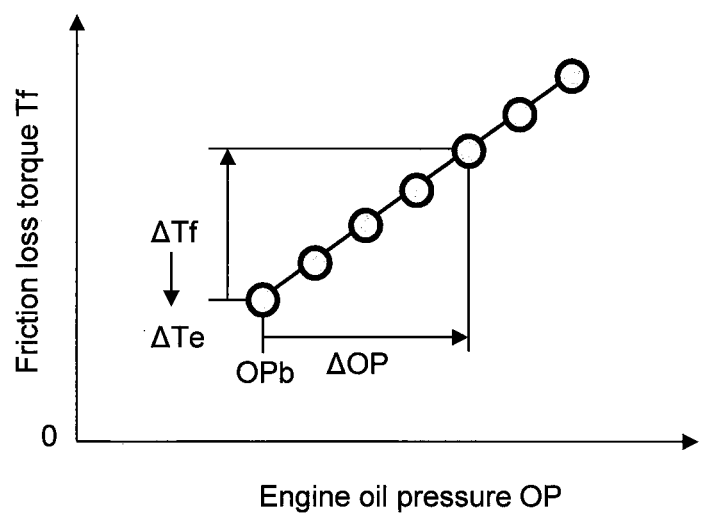
FIG. 5 is a graph that illustrates a relationship between friction loss torque Tf of an internal combustion engine and engine oil pressure OP.

FIG. 5 is a graph that illustrates a relationship between friction loss torque Tf of the internal combustion engine 20 and engine oil pressure OP. In more detail, FIG. 5 illustrates a relationship under engine operating conditions that the engine speed NE and the engine cooling water temperature THW are both constant. It should be noted that the friction loss torque Tf corresponds to a loss torque due to the friction resistance of individual sliding portions of the internal combustion engine 20, and is included in "engine resistance torque Tr" according to the present disclosure. The engine resistance torque Tr comprehensively indicate torques that act against the rotation of the internal combustion engine 20, and, for example, includes pumping loss torque Tp described later and torque associated with accessory drive losses, in addition to the friction loss torque Tf. The above-described required engine braking torque Te is based on this engine resistance torque Tr.

As shown in FIG. 5, the friction loss torque Tf becomes higher when the engine oil pressure OP is higher. This is because, when the engine oil pressure OP is higher, the friction resistance of the individual sliding portions of the internal combustion engine 20 becomes greater.

The oil pressure increase processing is executed to use the friction loss torque Tf that increases in association with the engine oil pressure OP, instead of the regenerative torque Tm that cannot be used in the fully charged state. To be more specific, in the example of the oil pressure increase processing executed in the present embodiment, the engine oil pressure OP is increased by a designated increase amount ΔOP. When the engine oil pressure OP is increased by the increase amount ΔOP, the friction loss torque Tf is increased by an increase amount ΔTf as shown in FIG. 5. According to the present embodiment, this increase amount ΔTf is used as an increase amount ΔTe of the required engine braking torque Te.

1-2-4. Processing of Control Device Concerning Control During Deceleration of Vehicle FIG. 6 is a flow chart that illustrates a routine of the processing concerning the control during the deceleration of the vehicle according to the first embodiment of the present disclosure. The control device 70 repeatedly executes the processing according to the present routine at a designated control interval.

According to the routine shown in FIG. 6, firstly, in step S100, the control device 70 determines, by the use of the accelerator position sensor 74, whether or not depression of the accelerator pedal is released. If, as a result, the determination result of step S100 is negative, the control device 70 ends the current processing cycle. It should be noted that, if depression of the accelerator pedal is not released, the control device 70 calculates a required total drive torque of the vehicle as a value depending on the accelerator position. Also, the control device 70 divides the calculated required total drive torque into a required engine torque (positive torque) and a required motor torque (positive torque) of the motor 52 in accordance with designated calculation rules.

If, on the other hand, the determination result of step S100 is positive, the control device 70 executes, in step S102, the fuel cut processing described above. In more detail, the fuel cut processing is executed, provided that the engine speed NE is higher than or equal to a designated value when depression of the accelerator pedal is released.

The control device 70 then determines in step S104 whether or not the SOC of the battery 64 is substantially equal to the upper limit value SOCmax. If, as a result, the determination result of step S104 is negative, (i.e., if the battery 64 is in the "non-fully charged state"), the processing proceeds to step S106.

In step S106, the control device 70 obtains, using, for example, the various sensors described above, each of measured values of the engine speed NE, in-cylinder charge air amount (i.e., engine load) KL and the engine cooling water temperature THW that are included in various engine operating condition parameters. The in-cylinder charge air amount KL can be obtained by, for example, inputting, into a known mathematical model of intake system, parameters including an intake air flow rate detected by the air flow sensor 28 and the engine speed NE calculated using the crank angle sensor 44.

The control device 70 then calculates the required engine braking torque Te and the required regenerative torque Tm in step S108.

At first, the required engine braking torque Te corresponds to a value of the engine braking torque generated by the internal combustion engine 20 under a condition that, as an example, the opening degree of the throttle valve 30 is constant at a desired designated opening degree (for example, minimum value Tamin). The control device 70 stores a map (not shown) that defines a relationship of this kind of required engine braking torque Te with respect to the engine speed NE, the in-cylinder charge air amount KL and the engine cooling water temperature THW. In this step S108, the control device 70 refers to this kind of map and calculates the required engine braking torque Te depending on the engine speed NE, the in-cylinder charge air amount KL and the engine cooling water temperature THW that are obtained in step S106. The map mentioned above can be, for example, prepared by performing an experiment in advance to obtain the data of the engine braking torque while changing each value of the engine speed NE, the in-cylinder charge air amount KL and the engine cooling water temperature THW. It should be noted that, instead of all of the engine speed NE, the in-cylinder charge air amount KL and the engine cooling water temperature THW, the required engine braking torque Te may be calculated on the basis of only the engine speed NE of them.

Furthermore, the required regenerative torque Tm is determined such that a desired required total braking torque TE is achieved under each engine speed NE, on the premise that the required engine braking torque Te that is determined as described above is generated. The control device 70 stores a map (not shown) that associates, with the engine speed NE, the values of the required regenerative torque Tm that can satisfy this kind of request. In this step S108, the control device 70 refers to this kind of map and calculates the required regenerative torque Tm depending on the engine speed NE obtained in step S106.

Following step S108, the processing proceeds to step S110. In step S110, the control device 70 calculates the required total braking torque TE. Specifically, the sum of the required engine braking torque Te and the required regenerative torque Tm that are calculated in step S108 is calculated as the required total braking torque TE. It should be noted that, with regard to the control during the deceleration according to the present embodiment, the calculation processing of steps S108 and S110 itself is not essential. However, according to this calculation processing, in an example in which ECUs are separately provided for a hybrid system which controls the overall system, the internal combustion engine 20 and the motor 52, respectively, the hybrid system can grasp the values of the braking torques Te and Tm.

Following step S110, the processing proceeds to step S112. In step S112, the control device 70 instructs, as a throttle opening degree Ta, the minimum value Tamin that is an example of the designated opening degree described above. As a result, the throttle valve 30 is controlled such that the minimum value Tamin is obtained.

Furthermore, in step S114, the control device 70 executes the regenerative braking such that the required regenerative torque Tm that is calculated in step S108 is generated. As a result, in the course of the vehicle being decelerating in response to depression of the accelerator pedal being released, both of the required engine braking torque Te and the required regenerative torque Tm are met and the required total braking torque TE is thus met.

If, on the other hand, the determination result of step S104 is positive (i.e., if the battery 64 is in the "fully charged state"), the processing proceeds to step S116. In step S116, the control device 70 obtains each of measured values of the engine speed NE, the in-cylinder charge air amount KL and the engine cooling water temperature THW with the same processing as step S106, and also obtains a measured value of the engine oil pressure OP by the use of the oil pressure sensor 38.

The control device 70 then calculates the required engine braking torque Te and the required regenerative torque Tm in step S118. An example of the calculation manner of the required engine braking torque Te is as already described in step S108. On the other hand, the calculation of the required regenerative torque Tm is different from the processing of step S108. That is to say, the processing of this step S118 is executed when the battery 64 is in the fully charged state (i.e., when, even if an electric power is generated by the regenerative braking, the electric power cannot be supplied to the battery 64). Because of this, in this step S118, the control device 70 calculates the required regenerative torque Tm as zero.

The control device 70 then determines in step S120 whether or not the engine oil pressure OP is higher than a minimum value OPmin. The minimum value OPmin corresponds to a minimum value of the engine oil pressure OP that can ensure the normal operation of the internal combustion engine 20. If the determination result of step S120 is negative (i.e., if the oil pressure increase processing cannot be performed), the control device 70 ends the current processing cycle. It should be noted that, when this determination result is negative, only a braking torque according to the required engine braking torque Te acts on the vehicle during the deceleration.

If, on the other hand, the determination result of step S120 is positive (OP>OPmin), the processing proceeds to step S122. In step S122, the control device 70 calculates a value of the engine oil pressure OP depending on the current engine operating condition (NE, KL, THW), that is, a base engine oil pressure OPb. The control device 70 stores a map (not shown) that defines a relationship of the base engine oil pressure OPb with respect to the engine speed NE, the in-cylinder charge air amount KL and the engine cooling water temperature THW. In this step S122, the control device 70 refers to this kind of map and calculates the base engine oil pressure OPb depending on the current engine operating condition.

The control device 70 then calculates, in step S124, the opening degree of the OCV 36 (i.e., required OCV opening degree) that is necessary to achieve a required engine oil pressure OPr that is the sum of the base engine oil pressure OPb calculated in step S122 and a designated increase amount ΔOP (OPb+ΔOP). To be more specific, the increase amount ΔOP is determined in advance such that, under a constant engine speed NE, the increase amount ΔTe does not exceed the value of the required regenerative torque Tm (see step S108) used during the deceleration in the non-fully charged state. According to the present embodiment, the increase amount ΔOP is a fixed value, as an example. However, the increase amount ΔOP may be changed in accordance with desired parameters, such as the engine speed NE, instead of the fixed value.

The control device 70 stores a map (not shown) that defines a relationship of the OCV opening degree with respect to the required engine oil pressure OPr, the engine speed NE, the in-cylinder charge air amount KL and the engine cooling water temperature THW. In this step S124, the control device 70 refers to this kind of map and calculates a required OCV opening degree depending on both of the current engine operating condition and the required engine oil pressure OPr.

The control device 70 then calculates an increase amount ΔTe of the required engine braking torque Te in step S126. This increase amount ΔTe corresponds to an increase amount of the required engine braking torque Te obtained when the engine oil pressure OP is increased by the increase amount ΔOP from the base engine oil pressure OPb as already described with reference to FIG. 5. The relationship between the friction loss torque Tf and the engine oil pressure OP as shown in FIG. 5 changes in accordance with the engine speed Ne and the engine cooling water temperature THW. Because of this, the control device 70 stores a map (not shown) that is determined such that the relationship between the friction loss torque Tf and the engine oil pressure OP changes in accordance with the engine speed Ne and the engine cooling water temperature THW. In this step S126, the control device 70 uses the relationship of this kind of map to calculate the increase amount ΔTe of the required engine braking torque Te obtained when the engine oil pressure OP is increased by the increase amount ΔOP described above. It should be noted that this increase amount ΔTe may alternatively be calculated so as to change in accordance with the in-cylinder charge air amount KL in addition to the engine speed NE and the engine cooling water temperature THW.

The control device 70 then calculates a final required engine braking torque Te' in step S128. In detail, the control device 70 calculates, as the final required engine braking torque Te', the sum (Te+ΔTe) of the required engine braking torque Te calculated in step S118 and the increase amount ΔTe calculated in step S126. The control device 70 then calculates, in step S130, a required total braking torque TE (=final required engine braking torque Te'+ΔTm) obtained when the engine oil pressure OP is increased by the increase amount ΔOP.

Then, in step S132, the control device 70 instructs, as the throttle opening degree Ta, the minimum value Tamin that is an example of the desired opening degree described above, with the processing similar to that of step S112. The control device 70 then controls the OCV 36 such that the required OCV opening degree calculated in step S124 is obtained. In more detail, the electric current that flows through the OCV 36 is controlled such that the required OCV opening degree is obtained. It should be noted that, during the deceleration of the vehicle, the engine speed NE changes in association with the progression of the deceleration. According to the processing of the present routine, if the engine speed NE changes, the calculated value of the base engine oil pressure OPb (step S122) changes. Thus, in association with a change of the engine speed NE during the deceleration, the required OCV opening degree (step S124) also changes.

It should be noted that, according to the routine shown in FIG. 6, the processing of step S108 (i.e., calculation of the required regenerative torque Tm) and the processing of step S114 corresponds to an example of the "regenerative braking processing" according to the present disclosure, and the processing of steps S122, S124 and S132 corresponds to an example of the "oil pressure increase processing" according to the present disclosure.

1-3. Advantageous Effects

Figure 7A:
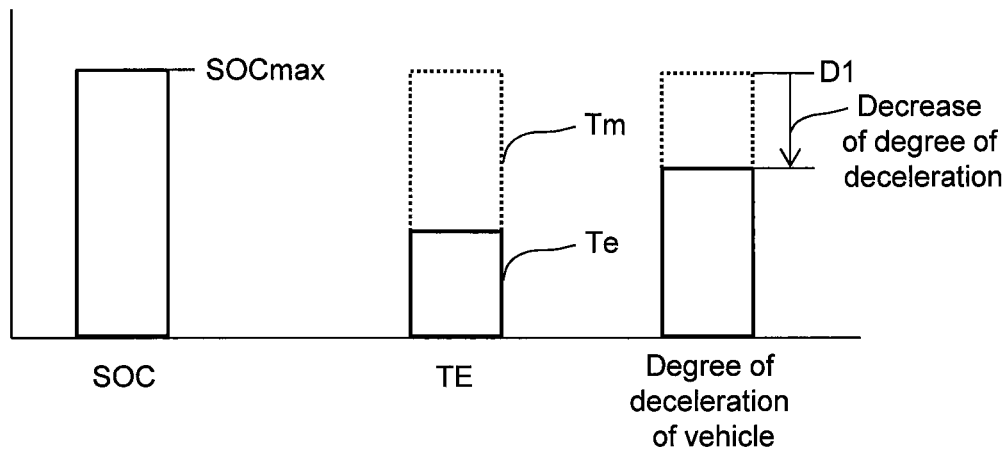
FIG. 7A is a graph that illustrates, with respect to a fully charged state without an oil pressure increase processing, a relationship among the SOC of the battery, the required total braking torque TE and the degree of deceleration of the vehicle.
Figure 7B:
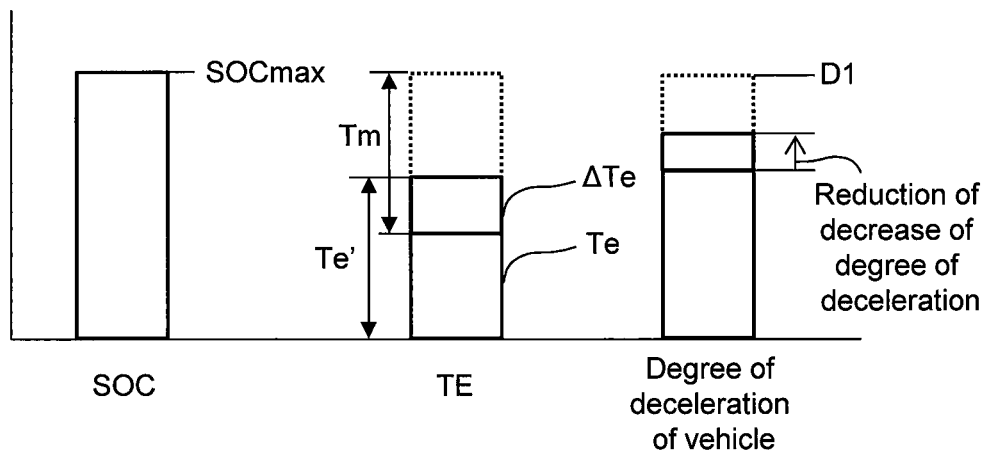
FIG. 7B is a graph that illustrates, with respect to the fully charged state with the oil pressure increase processing, a relationship among the SOC of the battery, the required total braking torque TE and the degree of deceleration of the vehicle.

FIGS. 7A and 7B are graphs that illustrate, with respect to the fully charged state, relationships among the SOC of the battery 64, the required total braking torque TE and the degree of deceleration of the vehicle in comparison between presence and absence of the oil pressure increase processing. FIG. 7A corresponds to an example without the oil pressure increase processing, and is thus the same as FIG. 2B. On the other hand, FIG. 7B corresponds to an example with the oil pressure increase processing.

According to the oil pressure increase processing of the present embodiment, where depression of the accelerator pedal is released when the battery 64 is in the fully charged state, the engine oil pressure OP is made higher than an oil pressure value (in the present embodiment, the base engine oil pressure OPb) used where depression of the accelerator pedal is released in the non-fully charged state. According to the control of the present embodiment accompanied by this kind of oil pressure increase processing, as shown in FIG. 7B, the final required engine braking torque Te' after the oil pressure increase processing becomes equal to the sum of the required engine braking torque Te according to the base engine oil pressure OPb and the increase amount ΔTe. As just described, in the fully charged state, the friction loss torque Tf (i.e., the engine resistance torque Tr) is increased by the increase amount ΔTe, whereby a decrease of the required total braking torque TE due to the fact that the regenerative braking cannot be used can be reduced (i.e., complemented) by an increase of the engine braking torque. Because of this, a decrease of the degree of deceleration of the vehicle can be reduced.

In addition, according to the control of the present embodiment, contrary to the countermeasures described with reference to FIG. 3, the engine resistance torque Tr can be increased without the need of increasing the intake pipe negative pressure and the in-cylinder negative pressure. As a result, a decrease of the degree of deceleration of the vehicle can be reduced without the need of increasing the amount of engine oil consumed. Furthermore, contrary to the countermeasures described with reference to FIG. 4, the engine resistance torque Tr can be increased without the need of increasing the engine speed NE. As a result, during the deceleration from a constant speed of the vehicle, a change of the engine speed NE according to whether or not the battery 64 is in the fully charged state can be prevented or reduced. Therefore, a decrease of the degree of deceleration of the vehicle can be reduced while the driver is not caused to feel strange due to the difference of engine sounds.

2. Second Embodiment

Next, a second embodiment according to the present disclosure will be described with reference to FIGS. 8 and 9. In the following explanation, it is supposed that the configuration shown in FIG. 1 is used as an example of the hardware configuration of the vehicle system according to the second embodiment. This also applies to a third embodiment and an example described in section 4-1. that are described later.

2-1. Control During Deceleration of Vehicle
2-1-1. Outline of Control During Deceleration of Vehicle in Fully Charged State In the first embodiment described above, in the fully charged state, a fixed value is used as the increase amount ΔOP of the engine oil pressure OP. That is to say, according to the control of the first embodiment, the increase amount ΔTe of the required engine braking torque Te changes depending on the increase amount ΔOP. In contrast to this, according to the control of the present embodiment, the increase amount ΔTe is determined so as to be equal to a value of the required regenerative torque Tm used during the deceleration in the non-fully charged state (in other words, so as to be equal to a regenerative torque generated by the regenerative braking processing in the non-fully charged state). Also, the increase amount ΔOP of the engine oil pressure OP is determined so as to satisfy the increase amount ΔTe determined in this way.

2-1-2. Processing of Control Device Concerning Control During Deceleration of Vehicle FIG. 8 is a flow chart that illustrates a routine of the processing concerning the control during the deceleration of the vehicle according to the second embodiment of the present disclosure. The processing of steps S100 to S122, S128 to S134 in the routine shown in FIG. 8 is as already described in the first embodiment.

The processing of the routine shown in FIG. 8 proceeds to step S200 after the calculation of the base engine oil pressure OPb in step S122. In step S200, the control device 70 calculates the increase amount ΔTe of the required engine braking torque Te as a value that is equal to the required regenerative torque Tm used during the deceleration in the non-fully charged state. In more detail, the required regenerative torque Tm changes in accordance with the engine speed NE as already described in association with the processing of step S108. Accordingly, in this step S200, the control device 70 refers to the map used in the processing of step S108 and obtains a map value of the required regenerative torque Tm associated with the current engine speed NE. Then, the control device 70 calculates the increase amount ΔTe that is equal to this map value.

Then, in step S202, the control device 70 calculates the increase amount ΔOP with respect to the base engine oil pressure OPb on the basis of the base engine oil pressure OPb and the increase amount ΔTe calculated in steps S122 and S200, respectively. In detail, the increase amount ΔOP is calculated so as to becomes equal to a value necessary to achieve the increase amount ΔTe (=ΔTf) from a map (not shown) that defines a relationship between the friction loss torque Tf and the engine oil pressure OP as shown in FIG. 5.

Then, in step S204, the control device 70 calculates the required OCV opening degree necessary to achieve the required engine oil pressure OPr by the processing similar to that of step S124. This required engine oil pressure OPr is equal to the sum of the base engine oil pressure OPb calculated in step S122 and the increase amount ΔOP calculated in step S202.

It should be noted that, according to the routine shown in FIG. 8, the processing of step S200 corresponds to an example of the "first processing" according to the present disclosure. Moreover, the processing of steps S202, S204 and S134 corresponds to an example of the "second processing" according to the present disclosure.

2-2. Advantageous Effects

Figure 9A:
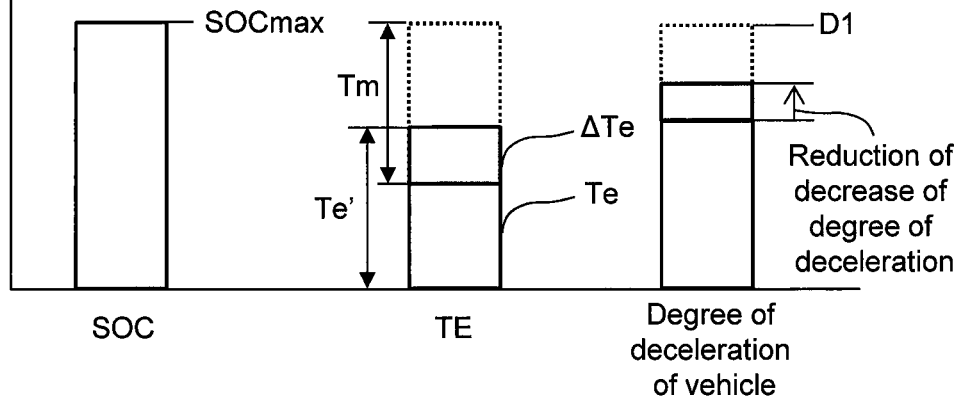
FIG. 9A is a graph for describing, in association with FIG. 9B, advantageous effects of the control during the deceleration of the vehicle according to the second embodiment of the present disclosure.
Figure 9B:
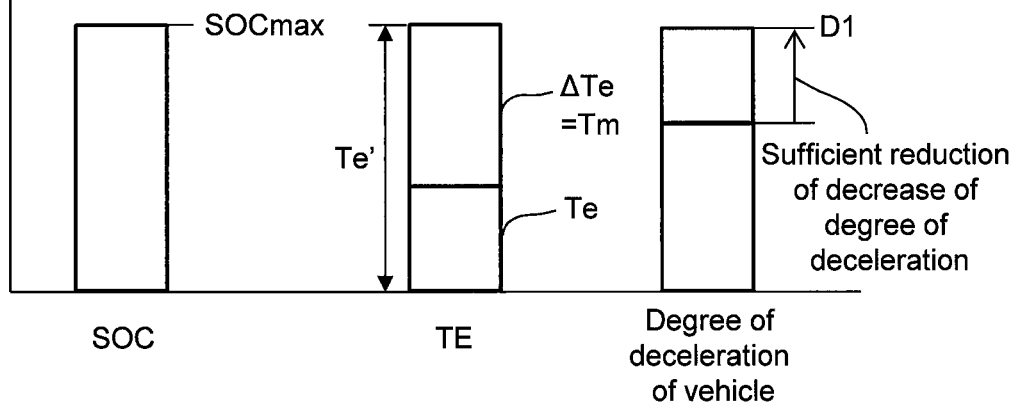
FIG. 9B is a graph for describing, in association with FIG. 9A, advantageous effects of the control during the deceleration of the vehicle according to the second embodiment of the present disclosure.

FIGS. 9A and 9B are graphs for describing advantageous effects of the control during the deceleration of the vehicle according to the second embodiment of the present disclosure. FIG. 9A is the same as FIG. 7B, and is associated with the example of the control according to the first embodiment. On the other hand, FIG. 9B is associated with the example of the control according to the present embodiment.

As shown in FIG. 9B, according to the oil pressure increase processing of the present embodiment, the engine oil pressure OP is increased such that the increase amount ΔTe of the required engine braking torque Te becomes equal to the value of the required regenerative torque Tm used during the deceleration in the non-fully charged state (more specifically, equal to the value that changes in accordance with the engine speed NE). That is to say, the engine braking torque equivalent to the regenerative torque is complemented by increasing the required engine braking torque Te. As a result, a decrease of the required total braking torque TE due to the fact that the regenerative braking cannot be used can be prevented or reduced. Because of this, a change of the degree of deceleration of the vehicle according to the SOC of the battery 64 (in other words, according to whether the battery 64 is in the fully charged state or the non-fully charged state) can be sufficiently reduced. In addition, a change of the degree of deceleration of the vehicle according to the SOC can be sufficiently reduced without the need of increasing the amount of engine oil consumed and without changing the engine sound in accordance with the SOC.

3. Third Embodiment

Next, a third embodiment according to the present disclosure will be described with reference to FIGS. 10 to 14.

3-1. Control During Deceleration of Vehicle 3-1-1. Outline of Control During Deceleration of Vehicle in Fully Charged State According to the control of the first embodiment described above, in order to increase the required engine braking torque Te in the fully charged state, the oil pressure increase processing for increasing the engine oil pressure OP is executed. In contrast to this, according to the control of the present embodiment, in order to increase the required engine braking torque Te in the fully charged state, a "throttle opening degree increase processing" as described below is executed instead of the oil pressure increase processing. The throttle opening degree increase processing corresponds to the processing to control the throttle valve 30 such that the throttle opening degree Ta becomes greater than an opening degree used where depression of the accelerator pedal is released in the non-fully charged state.

Figure 10:
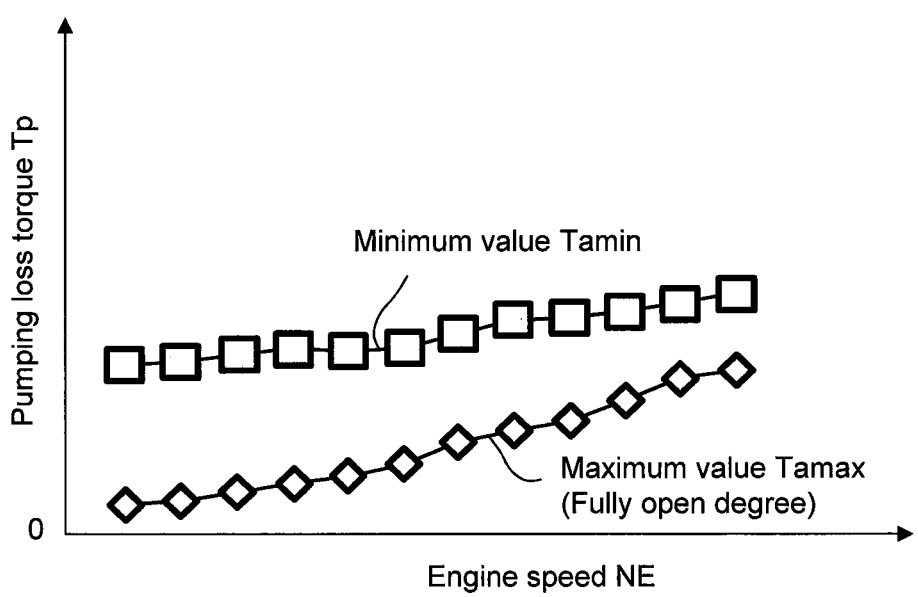
FIG. 10 is a graph that illustrates a relationship between pumping loss torque Tp and the engine speed NE in comparison between a minimum value Tamin and a maximum value Tamax of a throttle opening degree Ta.

FIG. 10 is a graph that illustrates a relationship between the pumping loss torque Tp and the engine speed NE in comparison between the minimum value Tamin and a maximum value Tamax of the throttle opening degree Ta. The pumping loss torque Tp corresponds to the sum of loss torques of all the cylinders of the internal combustion engine 20 due to the pumping loss produced in each cylinder. The minimum value Tamin shown in FIG. 10 corresponds to a minimum value within a desired control range of the throttle opening degree Ta, and the maximum value Tamax corresponds to a maximum value within the control range (i.e. fully open degree). As shown in FIG. 10, the pumping loss torque Tp under each engine speed NE becomes higher when the throttle opening degree Ta is controlled at the minimum value Tamin than when it is controlled at the maximum value Tamax. In addition, as shown in FIG. 10, the difference therebetween becomes smaller when the engine speed NE becomes higher.

Figure 11:
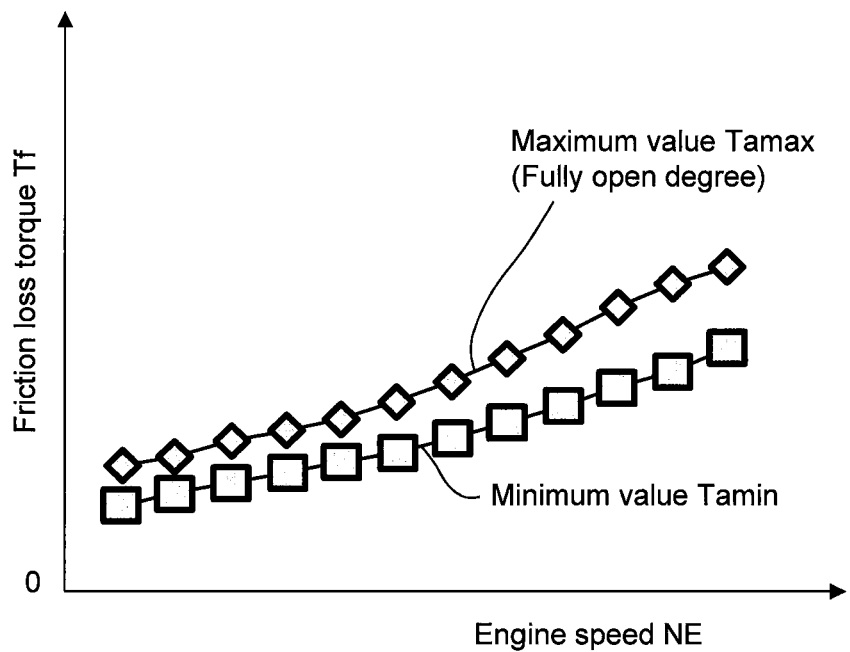
FIG. 11 is a graph that illustrates a relationship between friction loss torque Tf and the engine speed NE in comparison between the minimum value Tamin and the maximum value Tamax of the throttle opening degree Ta.

Next, FIG. 11 is a graph that illustrates a relationship between the friction loss torque Tf and the engine speed NE in comparison between the minimum value Tamin and the maximum value Tamax of the throttle opening degree Ta. As a result of earnest study, the inventor has found that, contrary to the pumping loss torque Tp, the friction loss torque Tf becomes higher when the throttle opening degree Ta is great than when it is small. Thus, as shown in FIG. 11, the friction loss torque Tf becomes higher when the throttle opening degree Ta is controlled at the maximum value Tamax than when it is controlled at the minimum value Tamin. The reason why the friction loss torque Tf changes in this way will be described as follows with reference to FIG. 12. In addition, as shown in FIG. 11, the difference therebetween in a region located on the high-speed side becomes greater than that in a region located on the low-speed side.

Figure 12:
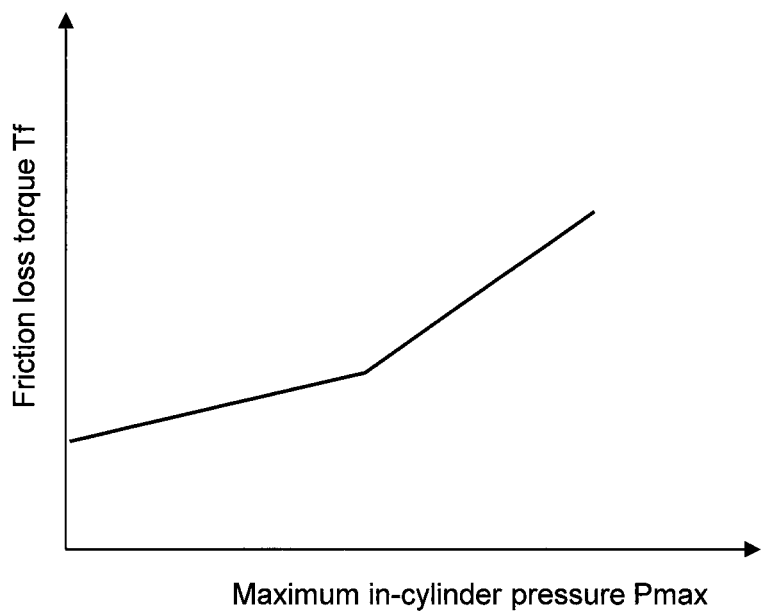
FIG. 12 is a graph that illustrates a relationship between the friction loss torque Tf and maximum in-cylinder pressure Pmax.

FIG. 12 is a graph that illustrates a relationship between the friction loss torque Tf and the maximum in-cylinder pressure Pmax. The maximum in-cylinder pressure Pmax corresponds to a maximum value of the in-cylinder pressure P during one cycle at the time of the motoring operation (i.e., fuel cut operation) in which combustion of the internal combustion engine 20 is not performed. If the throttle opening degree Ta is increased to increase the in-cylinder charge air amount KL, the maximum in-cylinder pressure Pmax becomes higher. Also, if the maximum in-cylinder pressure Pmax becomes higher, loads that act on the respective sliding portions of a piston and a connecting rod become higher in the compression stroke. Because of this, as shown in FIG. 12, the friction loss torque Tf becomes higher when the maximum in-cylinder pressure Pmax is higher. Consequently, the results shown in FIG. 11 are achieved.

Figure 13:
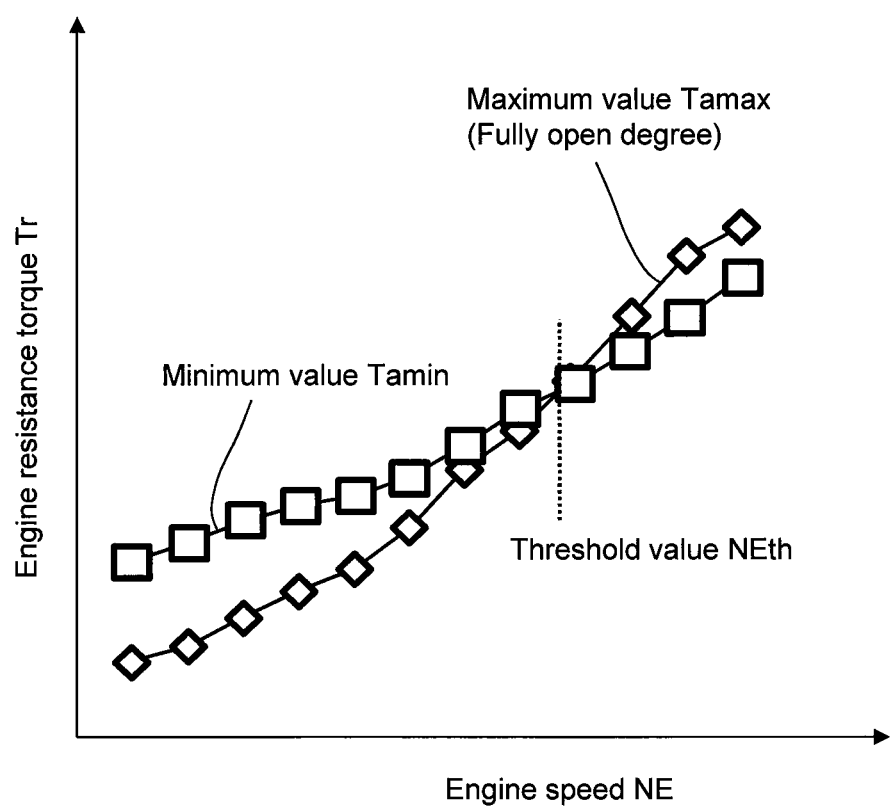
FIG. 13 is a graph that illustrates a relationship between engine resistance torque Tr and the engine speed NE in comparison between the minimum value Tamin and the maximum value Tamax of the throttle opening degree Ta.

Next, FIG. 13 is a graph that illustrates a relationship between the engine resistance torque Tr and the engine speed NE in comparison between the minimum value Tamin and the maximum value Tamax of the throttle opening degree Ta. The relationship shown in FIG. 13 is obtained by adding the relationship shown in FIG. 10 to the relationship shown in FIG. 11. As shown in FIG. 13, in a region located on the low-speed side, the contribution of the pumping loss torque Tp is greater. Thus, the engine resistance torque Tr becomes higher when the throttle opening degree Ta is controlled at the minimum value Tamin than when it is controlled at the maximum value Tamax. In contrast to this, if the engine speed NE becomes higher than a value (threshold value NEth), the engine resistance torque Tr becomes higher when the throttle opening degree Ta is controlled at the maximum value Tamax than when it is controlled at the minimum value Tamin. It should be noted that, when the throttle opening degree Ta is controlled at a value located between the minimum value Tamin and the maximum value Tamax, the value of the engine resistance torque Tr is located, at each engine speed NE, between two plot values shown in FIG. 13, although it is not illustrated in FIG. 13.

According to the knowledge shown in FIG. 13 obtained as a result of earnest study by the inventor, in a high-speed region in which the engine speed NE is higher than the threshold value NEth, the required engine braking torque Te can be increased by executing the throttle opening degree increase processing. In addition, the throttle opening degree Ta used in the throttle opening degree increase processing according to the present embodiment is the maximum value Tamax (i.e., fully open degree), as an example. That is to say, according to the control of the present embodiment, where depression of the accelerator pedal is released when the battery 64 is in the fully charged state and the engine speed NE is higher than the threshold value NEth, in order to increase the required engine braking torque Te, the throttle valve 30 is controlled such that the maximum value Tamax (i.e., fully open degree) is obtained.

Figure 14:
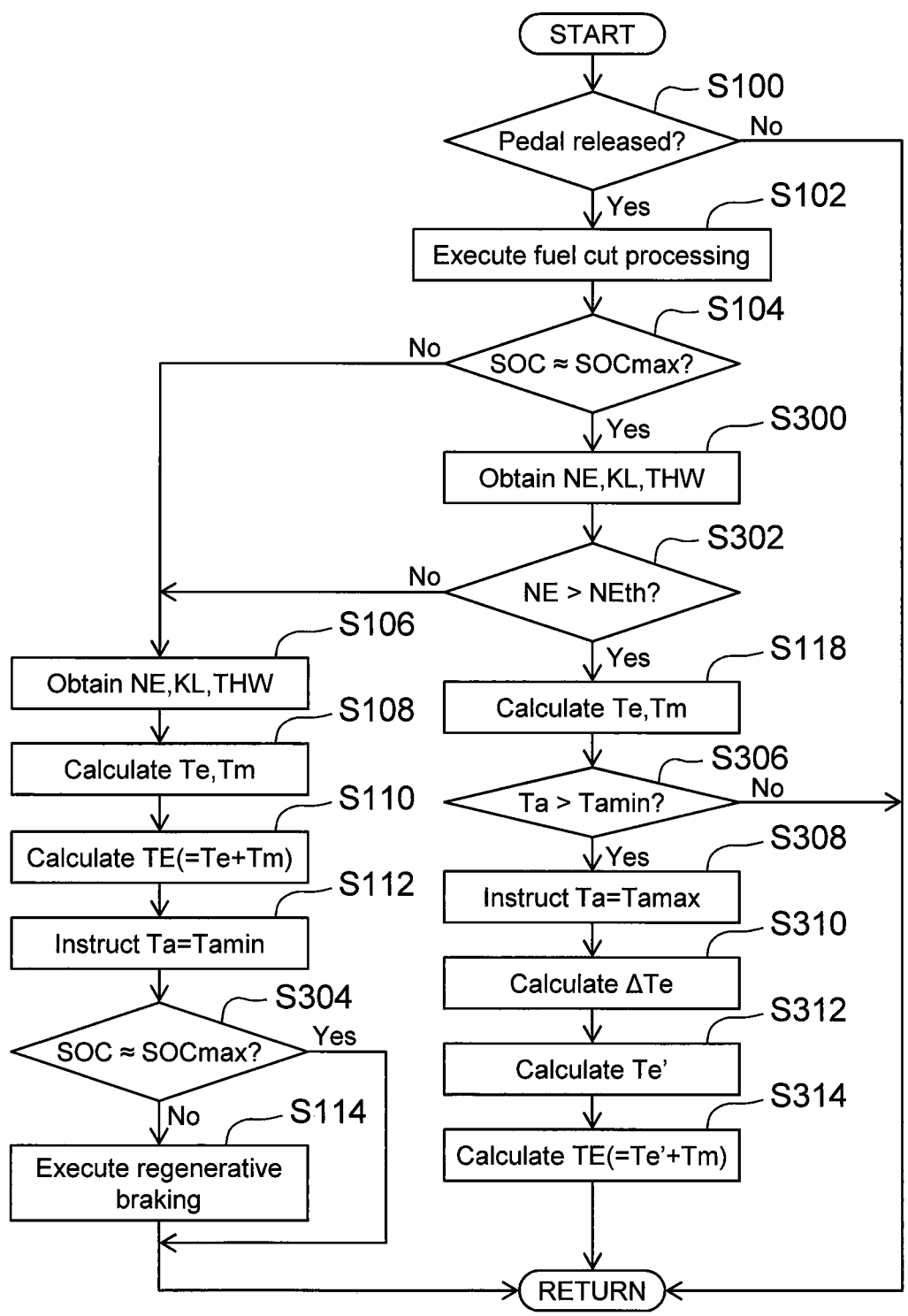
FIG. 14 is a flow chart that illustrates a routine of the processing concerning control during the deceleration of the vehicle according to a third embodiment of the present disclosure.

3-1-2. Processing of Control Device Concerning Control During Deceleration of Vehicle FIG. 14 is a flow chart that illustrates a routine of the processing concerning the control during the deceleration of the vehicle according to the third embodiment of the present disclosure. The processing of steps S100 to S114 in the routine shown in FIG. 14 is as already described in the first embodiment.

If the determination result of step S104 is positive (SOC≈SOCmax), the processing of the routine shown in FIG. 14 proceeds to step S300. In step S300, the control device 70 obtains the various engine operating condition parameters (NE, KL and THW), similarly to the processing of step S106. Thereafter, the processing proceeds to step S302.

In step S302, the control device 70 determines whether or not the engine speed NE is higher than the threshold value NEth described above. The threshold value NEth corresponds to a lower limit value of the engine speed NE within an engine speed region in which the value of the engine resistance torque Tr produced when the maximum value Tamax is selected exceeds the value of the engine resistance torque Tr produced when the minimum value Tamin is selected.

If the determination result of step S302 is negative (NE≤NEth), that is, if it can be judged that, even when the maximum value Tamax is selected, the engine resistance torque Tr cannot be increased, the processing proceeds to step S106. Following steps S106 to S112, the processing of the routine shown in FIG. 14 proceeds to step S304.

In step S304, similarly to the processing of step S104, the control device 70 determines whether or not the SOC of the battery 64 is substantially equal to the upper limit value SOCmax. If, as a result, the determination result of step S304 is negative (i.e., if the battery 64 is in the "non-fully charged state"), the control device 70 executes, in step S114, the regenerative braking such that the required regenerative torque Tm is generated. If, on the other hand, the determination result of step S304 is positive (i.e., if it is determined in step S302 that, even when the maximum value Tamax is selected, the engine resistance torque Tr cannot be increased), the control device 70 skips the processing of step S114 to end the current processing cycle.

If, on the other hand, the determination result of step S302 is positive (NE>NEth), that is, if it can be judged that, when the maximum value Tamax is selected, the engine resistance torque Tr can be increased, the processing proceeds to step S306 after the calculation of the required engine braking torque Te and the required regenerative torque Tm (zero) in step S118.

In step S306, the control device 70 determines, using the throttle opening degree sensor 32, whether or not the measured value of the current throttle opening degree Ta is greater than the minimum value Tamin. This processing is performed to determine whether or not the throttle valve 30 normally operates. If the determination result of step S306 is negative (Ta≤Tamin), the control device 70 ends the current processing cycle.

If, on the other hand, the determination result of step S306 is positive (Ta>Tamin), the processing proceeds to step S308. In step S308, the control device 70 instructs the maximum value Tamax (i.e., fully open degree) as the throttle opening degree Ta. As a result, the throttle valve 30 is controlled such that the maximum value Tamax is obtained.

Then, in step S310, the control device 70 calculates the increase amount ΔTe of the required engine braking torque Te. In detail, the control device 70 stores maps (not shown) that each define a relationship between the engine resistance torque Tr and the engine speed NE as shown in FIG. 13. The maps are prepared not only for the minimum value Tamin and the maximum value Tamax but also for individual intermediate opening degrees located therebetween. In this step S310, firstly, the control device 70 calculates, from one of the maps described above, a value Tr1 of the engine resistance torque Tr depending on the throttle opening degree Ta and the engine speed NE at a time point at which depression of the accelerator pedal is recently released. The control device 70 then calculates, from one of the maps described above, a value Tr2 of the engine resistance torque Tr depending on the maximum value Tamax and the current engine speed NE. Also, the control device 70 calculates, as the increase amount ΔTe described above, an increase amount ΔTr of the engine resistance torque Tr obtained by subtracting the value Tr1 from the value Tr2.

Then, in step S312, the control device 70 calculates the final required engine braking torque Te'. In detail, the control device 70 calculates, as the final required engine braking torque Te', the sum (Te+ΔTe) of the required engine braking torque Te calculated in step S118 and the increase amount ΔTe calculated in step S310. Then, in step S314, the control device 70 calculates the required total braking torque TE (=final required engine braking torque Te'+ΔTm) obtained when the throttle opening degree Ta is increased to the maximum value Tamax.

It should be noted that the processing of step S308 corresponds to an example of the "throttle opening degree increase processing" according to the present disclosure.

3-2. Advantageous Effects

According to the control of the present embodiment, where depression of the accelerator pedal is released when the battery 64 is in the fully charged state, the throttle valve 30 is controlled so as to have a throttle opening degree Ta (in the present embodiment, the maximum value Tamax) that is greater than a throttle opening degree Ta (in the present embodiment, the minimum value Tamin) used where depression of the accelerator pedal is released when the battery 64 is in the non-fully charged state and the engine speed NE is higher than the threshold value NEth. According to the control of the present embodiment accompanied by this kind of throttle opening degree increase processing, during the deceleration in the fully charged state, the friction loss torque Tf (i.e., the engine resistance torque Tr) is increased by increasing the throttle opening degree Ta, provided that the engine speed NE is higher than the threshold value NEth. By increasing the throttle opening degree Ta in this way, a decrease of the required total braking torque TE due to the fact that the regenerative braking cannot be used can be reduced (i.e., complemented). Therefore, a decrease of the degree of deceleration of the vehicle can be reduced. Also, similarly to the first embodiment, a decrease of the degree of deceleration of the vehicle can be reduced without the need of increasing the amount of engine oil consumed while the driver is not caused to feel strange due to the difference of engine sounds. Furthermore, an increase of the throttle opening degree Ta is effective to reduce the amount of engine oil consumed. That is to say, according to the control of the present embodiment, a decrease of the degree of deceleration of the vehicle can be reduced while reducing the amount of engine oil consumed as compared to the control of the first embodiment that uses the oil pressure increase processing.

3-3. Modification Examples 3-3-1. Another Example of Throttle Opening Degree Ta Used in Throttle Opening Degree Increase Processing In the example of the throttle opening degree increase processing according to the third embodiment described above, the throttle opening degree Ta is opened to the maximum value Tamax (i.e., fully open degree). However, the throttle opening degree Ta used in the "throttle opening degree increase processing" according to the present disclosure may alternatively be a desired opening degree other than the maximum value Tamax (i.e., fully open degree), provided that the throttle opening degree Ta is greater than a throttle opening degree used where depression of the accelerator pedal is released in the non-fully charged state.

3-3-2. Example of Selection of Manner of Increasing Engine Resistance Torque Tr Depending on Engine Speed Regions In the third embodiment described above, in order to increase the engine resistance torque Tr in a high-speed region in which the engine speed NE is higher than the threshold value NEth, the throttle opening degree increase processing is used. With respect to this kind of control example, additional processing may be included such that an oil pressure increase processing similar to that according to the first or second embodiment is executed in a low-speed region in which the engine speed NE is lower than or equal to the threshold value NEth.

4. Other Embodiments 4-1. Examples of Combination of Oil Pressure Increase Processing and Throttle Opening Degree Increase Processing In an engine speed region (NE>NEth) in which the throttle opening degree increase processing is available, in order to increase the engine resistance torque Tr in the fully charged state, the oil pressure increase processing and the throttle opening degree increase processing may be combined with each other. More specifically, these may be, for example, combined as in an example described below with reference to FIG. 15.

Figure 15:
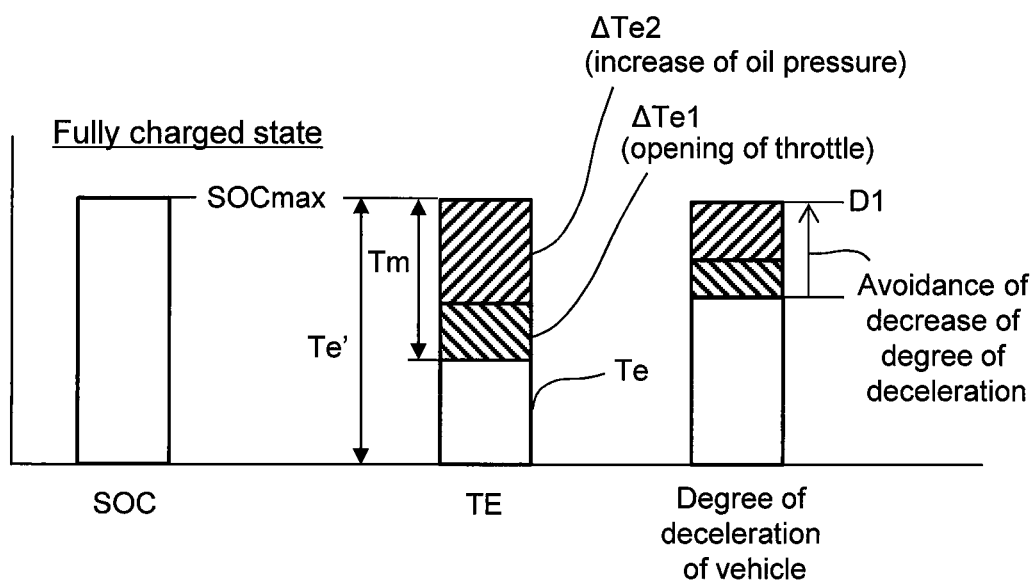
FIG. 15 is a graph for describing an example of combination of the oil pressure increase processing and an throttle opening degree increase processing.

FIG. 15 is a graph for describing an example of combination of the oil pressure increase processing and the throttle opening degree increase processing. In FIG. 15, an increase amount of the required engine braking torque Te by the throttle opening degree increase processing is referred to as $\Delta Te1$, and an increase amount by the oil pressure increase processing is referred to as $\Delta Te2$. In the example shown in FIG. 15, in order to obtain the increase amount $\Delta Te$ (=$\Delta Te1$+$\Delta Te2$) that is equal to the value of the required regenerative torque Tm used during the deceleration in the non-fully charged state, the oil pressure increase processing and the throttle opening degree increase processing are jointly used.

To be more specific, according to the example shown in FIG. 15, firstly, the increase amount $\Delta Te1$ is achieved by controlling the throttle opening degree Ta to the maximum value Tamax by the throttle opening degree increase processing. On that basis, the increase amount $\Delta OP$ of the engine oil pressure OP that can achieve the remaining increase amount $\Delta Te2$ is calculated by, for example, the processing similar to that of step S202 described above. Then, the OCV 36 is controlled such that the calculated increase amount $\Delta OP$ is achieved. As a result, an engine braking torque equivalent to the required regenerative torque Tm can be complemented while jointly using the oil pressure increase processing and the throttle opening degree increase processing.

Moreover, the oil pressure increase processing and the throttle opening degree increase processing may be, for example, combined with each other as follows, instead of the example shown in FIG. 15. That is to say, if, for example, the increase amount $\Delta OP$ of the engine oil pressure OP is limited, firstly, the engine oil pressure OP may be increased as much as possible within a possible range. On that basis, if the increase amount $\Delta Te$ that is equal to the value of the required regenerative torque Tm used during the deceleration in the non-fully charged state cannot be obtained by executing only this kind of oil pressure increase processing, the throttle opening degree increase processing may be jointly used.

Furthermore, in order to cause the increase amount $\Delta Te$ that is equal to the value of the required regenerative torque Tm used during the deceleration in the non-fully charged state to be obtained, the respective proportions of the increase amount $\Delta Te1$ and increase amount $\Delta Te2$ to the required regenerative torque Tm may be determined as desired values, instead of the example described above. Alternatively, as one of examples of simple combination thereof, the increase amount $\Delta Te1$ and the increase amount $\Delta Te2$ may be determined as follows while taking into consideration that the sum of the increase amount $\Delta Te1$ and the increase amount $\Delta Te2$ do not exceed the value of the required regenerative torque Tm. That is to say, the increase amount $\Delta Te1$ by the throttle opening degree increase processing may be determined by the use of a fixed opening degree (for example, maximum value Tamax), and the increase amount $\Delta Te2$ by the oil pressure increase processing may be determined by the use of the increase amount $\Delta OP$ that is a fixed value.

4-2. Another Example of Oil Pressure Control Device

In the first to third embodiments and the example described in section 4-1. that are described above, the OCV 36 is used as the oil pressure control device. However, the "oil pressure control device" according to the present disclosure may be, for example, be a variable displacement device (more specifically, a device that can change the displacement volume of engine oil (i.e., pump capacity)) included in a variable displacement oil pump, instead of the example described above. Thus, in another example of the oil pressure increase processing, the displacement volume of the engine oil may be increased by the use of this kind of the variable displacement device. It should be noted that, according to this example, not only an increase amount of the friction loss torque Tf due to an increase of the engine oil pressure OP but also the torque associated with the accessory drive losses due to an increase of the displacement volume is included in the engine resistance torque Tr described above.

4-3. Another Example of Vehicle System to Which Control During Deceleration of Vehicle Is Applied The controls during the deceleration of the vehicle in the example of the first to third embodiments and the example described in the section 4-1. are directed to the vehicle system 10 that is the hybrid vehicle system that includes the motor generators 50 and 52 in addition to the internal combustion engine 20 as power sources of the vehicle. However, the vehicle system to which the control according to the present disclosure is applied may not always be the example of the hybrid vehicle described above, as long as it is provided with a regenerative braking device that recovers the kinetic energy of a vehicle during the deceleration thereof to convert it into electric power and a battery that charges the electric power. That is to say, one of other examples of the vehicle system according to the present disclosure may be a vehicle system that include only an internal combustion engine as a power source of the vehicle and that can perform the regenerative braking using an alternator that is installed on this internal combustion engine.

The embodiments and modification examples described above may be combined in other ways than those explicitly described above as required and may be modified in various ways without departing from the scope of the present disclosure.

What is claimed is:
1. A vehicle system, comprising:
  a regenerative braking device configured to recover kinetic energy of a vehicle during deceleration of the vehicle to convert the kinetic energy into electric power;
  a battery configured to charge the electric power;
  an internal combustion engine including a fuel injection valve and an oil pressure control device that controls engine oil pressure; and
  a control device configured to control the internal combustion engine and the regenerative braking device, wherein the control device is configured to:

execute, where depression of an accelerator pedal is released when the battery is in a non-fully charged state, a fuel cut processing to control the fuel injection valve to stop fuel injection and a regenerative braking processing to actuate the regenerative braking device; and execute, where depression of the accelerator pedal is released when the battery is in a fully charged state, the fuel cut processing and an oil pressure increase processing to control the oil pressure control device such that the engine oil pressure becomes higher than an oil pressure value used where depression of the accelerator pedal is released in the non-fully charged state.

2. The vehicle system according to claim 1, wherein the internal combustion engine includes a throttle valve arranged in an intake air passage, and wherein the control device is configured, where depression of the accelerator pedal is released when the battery is in the fully charged state and engine speed is higher than a threshold value, to execute, in addition to the fuel cut processing and the oil pressure increase processing, a throttle opening degree increase processing to control the throttle valve such that an opening degree of the throttle valve becomes greater than an opening degree used where depression of the accelerator pedal is released in the non-fully charged state.

3. The vehicle system according to claim 1, wherein the oil pressure increase processing includes:

a first processing to calculate an increase amount of the engine oil pressure necessary to increase an engine braking torque by an increase amount that is equal to a regenerative torque generated by the regenerative braking processing in the non-fully charged state; and a second processing to control the oil pressure control device such that the engine oil pressure increases by the calculated increase amount of the engine oil pressure.

4. A vehicle system, comprising:

a regenerative braking device configured to recover kinetic energy of a vehicle during deceleration of the vehicle to convert the kinetic energy into electric power;

a battery configured to charge the electric power;

an internal combustion engine including a fuel injection valve and a throttle valve arranged in an intake air passage; and a control device configured to control the internal combustion engine and the regenerative braking device, wherein the control device is configured to:

execute, where depression of an accelerator pedal is released when the battery is in a non-fully charged state, a fuel cut processing to control the fuel injection valve to stop fuel injection and a regenerative braking processing to actuate the regenerative braking device; and execute, where depression of the accelerator pedal is released when the battery is in a fully charged state and engine speed is higher than a threshold value, the fuel cut processing and a throttle opening degree increase processing to control the throttle valve such that an opening degree of the throttle valve becomes greater than an opening degree used where depression of the accelerator pedal is released in the non-fully charged state.

\* \* \* \* \*